United States Patent
Dumet et al.

(10) Patent No.: US 7,804,838 B2
(45) Date of Patent: Sep. 28, 2010

(54) TIME SYNCHRONIZING DEVICE AND PROCESS AND ASSOCIATED PRODUCTS

(75) Inventors: Sylvain Dumet, Merchtem (BE); Dirk Van De Poel, Edegem (BE)

(73) Assignee: Thomson Licensing, Issy les Moulineaux (FR)

( * ) Notice: Subject to any disclaimer, the term of this patent is extended or adjusted under 35 U.S.C. 154(b) by 891 days.

(21) Appl. No.: 10/585,534

(22) PCT Filed: Jan. 3, 2005

(86) PCT No.: PCT/EP2005/050002

§ 371 (c)(1), (2), (4) Date: Jul. 10, 2006

(87) PCT Pub. No.: WO2005/069521

PCT Pub. Date: Jul. 28, 2005

(65) Prior Publication Data

US 2009/0201936 A1    Aug. 13, 2009

(30) Foreign Application Priority Data

Jan. 9, 2004    (EP) .................................. 04447003

(51) Int. Cl.
*H04L 12/56* (2006.01)
*H04L 12/54* (2006.01)
*H04J 3/06* (2006.01)

(52) U.S. Cl. ..................... 370/401; 370/428; 370/503

(58) Field of Classification Search ............... None
See application file for complete search history.

(56) References Cited

U.S. PATENT DOCUMENTS

| 6,915,353 | B2 * | 7/2005 | Burkes et al. | 709/248 |
|---|---|---|---|---|
| 7,190,703 | B1 * | 3/2007 | Heitmann | 370/508 |
| 2002/0129291 | A1 | 9/2002 | Gonzalez | |
| 2003/0200338 | A1 | 10/2003 | Fulghum et al. | |
| 2004/0205330 | A1 * | 10/2004 | Godfrey et al. | 713/150 |

OTHER PUBLICATIONS

Search Report Dated Feb. 18, 2005.

* cited by examiner

*Primary Examiner*—Pankaj Kumar
*Assistant Examiner*—Marcus R Smith
(74) *Attorney, Agent, or Firm*—Robert D. Shedd; Joseph J. Opalach; Catherine A. Cooper

(57) ABSTRACT

The present invention concerns a time synchronizing device and process, and a local gateway comprising that device. The time synchronizing device synchronizes a router arranged between two communication networks. It comprises intercepting means of a message coming from an apparatus of a source network for that message, having a specific time clock, and directed to a target network for that message, preparing means of a time request able to be executed in that apparatus so as to cause synchronizing data based on that specific clock to be obtained from that apparatus and to be transmitted back to the synchronizing device, sending means of the time request to the apparatus, forwarding means of the intercepted message to the target network after the preparing means have prepared the time request, receiving means of the synchronizing data, and exploiting means of those data to synchronize a local time clock used by the router with respect to that specific time clock .Application to home networks.

12 Claims, 3 Drawing Sheets

TIME SYNCHRONIZING DEVICE AND PROCESS AND ASSOCIATED PRODUCTS

This application claims the benefit, under 35 U.S.C. §365 of International Application PCT/EP05/050002 filed Jan. 3, 2005, which was published in accordance with PCT Article 21(2) on Jul. 28, 2005 in English and which claims the benefit of European patent application No. 04447003.7, filed Jan. 9, 2004.

The present invention relates to time synchronizing device and process and to corresponding products, including a local gateway.

Home gateways, which are used for home users to connect to external networks, mainly to the Internet, usually need time awareness. This allows e.g. Internet services for some users only at certain points in time or to include the time in event logging. As home gateways are consumer home-network appliances, everything is done to keep their price as low as possible, so as to reach the largest audience. However, this causes those devices to suffer from lack of liable embedded real time clock, and so makes them depend on an external device in the external network.

Typically, known home gateways thus use the widespread NTP protocol (for "Network Time Protocol"), or its adaptation to Internet, SNTP ("Simple NTP"), so as to synchronize the clocks of gateways over a network. Those protocols include retrieving time information from that network. More specifically, clients can get time from a centralized server, being a timeserver.

Such a timeserver is generally expensive, because it needs to connect to an accurate reference clock and is intended to support thousands of clients. Some timeservers are in fact publicly available on the Internet, but depending on such a public server involves a risk regarding reliable services. Namely, timeservers could be compromised by hackers impersonating them, and being thereby able to remotely influence home gateway behavior.

Moreover, getting time requires full connectivity of the gateways to that timeserver. Therefore, when connectivity to the latter is interrupted (for instance in case of DSL line down—for "Digital Subscriber Line", or unavailability of an NTP timeserver), some home network applications may no longer work as expected. Also, when one central timeserver on the Internet (used by all home gateways of a single vendor) is down or unreachable, the home gateway functionalities are affected, which may notably disallow access to the Internet.

Further, time given by the timeserver is an absolute time, which does not take time zones into account. This is all the more complicated in view of daylight saving time, since the gap between the provided time and the local correct time depends on the periods of the year. A solution to that problem consists in storing at the timeserver, time information on the various devices liable to be synchronized with it This however implies relatively heavy dynamic management and compels appropriate storing at the timeserver side. Another solution relies on systematically adapting the time received at the home gateways from the timeserver, based on data stored at the gateways. This however involves additional management and storing in the gateways, and thus increases the cost of the latter.

The invention concerns a time synchronizing device that may be able to provide precise time to gateways, notably to home gateways, while remedying the risks of connection loss with respect to network timeservers or failure thereof, and being economic compared to the integrated presence of accurate clocks in the gateways. The synchronizing device according to the invention may also be liable to provide time adapted to local time specificities, without requiring complex storing at a timeserver side or tedious management at the gateway side. Also, the synchronizing device of the invention could be at the same time economic, compared to the costs for controlling a precise timeserver, and safe compared to the dependency on publicly available timeservers.

The invention applies more generally to routers, which may be in particular gateways or modems.

The invention also concerns a time synchronizing process and a computer program liable to offer the advantages mentioned above, as well as a local gateway comprising a time synchronizing device compliant with the invention.

To this end, the invention relates to a time synchronizing device for synchronizing a router arranged between two communication networks. That synchronizing device comprises:
  receiving means for receiving synchronizing data based on a reference time clock,
  and exploiting means for exploiting those synchronizing data so as to synchronize a local time clock used by that router with respect to the reference time clock.

According to the invention, the time synchronizing device comprises:
  intercepting means for intercepting at least one message coming from at least one apparatus being a point of at least one of those networks, called the source network for that message, and directed to the other of those networks, called the target network for that message, that apparatus having a specific time clock,
  preparing means for preparing a time request intended for that apparatus, the time request being able to be executed in that apparatus so as to cause the synchronizing data based on that specific time clock to be obtained from that apparatus and to be transmitted back to the synchronizing device,
  sending means for sending the time request to that apparatus,
  and forwarding means for forwarding the intercepted message to the target network after the preparing means have prepared the time request.

Further, the receiving means are intended to receive the synchronizing data from that apparatus and the exploiting means are able to exploit the synchronizing data so as to synchronize the local time clock with respect to that specific time clock. The receiving means, exploiting means, intercepting means, preparing means, sending means and forwarding means form an operational set.

Thus, surprisingly and in contrast with what is usually done, the required time is not obtained from a central timeserver over a network, according to a given protocol such as NTP, but can be obtained from one or several local apparatus, advantageously from personal computers ("PCs"). This relies on the special features of the time synchronizing device of the invention, which include notably the ability to intercept messages from a network to another, and to send back an appropriate time request accordingly.

Thereby, synchronization may be done even when a timeserver is not available, and may increase safety by reducing the dependence on external time sources. Also, it may make optional the knowledge of time zone and daylight saving time indication regarding a local network, since that information is already taken into account in the received time (the "time" meaning date and/or hour). Those local data may anyway be obtained without difficulty by the time synchronizing device in preferred embodiments of the invention, directly from the involved apparatus in a given local network. Further, the synchronizing device of the invention does not require the additional router cost of an embedded good precision hardware real-time clock. A supplementary asset thereof is that it may enable to reduce network load on the Internet, by not contacting timeservers (or by at least reducing the number of communications), while instead learning the time locally.

This is particularly interesting when the router is a local gateway and the apparatus are PCs. In a preferred embodiment, the source network is then a local area network ("LAN") and the target network is an external network, such as notably the Internet or other wide area network ("WAN"), for all intercepted messages.

As a matter of fact, time on home user computers can be considered as quite accurate. For example, a home gateway being the way to reach the external world, the home computer information provides partially or completely the time configuration. The time request may then have the form of a small program returned or inserted by the home gateway when a user requests information from the external network, preferably via the HTTP protocol (for "HyperText Transfer Protocol"). Namely and as an illustration, the user addressing an HTTP server and expecting a response, such a small program is inserted as a script in a temporary page. It is then executed in the user Web browser of a PC, and makes sure the home user computer time is present in following requests for information. The home gateway monitors afterwards the reply sent from the PC to learn the computer time.

The time synchronizing device may be integrated in the router, or be in the form of an external device connected to the router. In the latter case, the synchronizing device may be coupled to several routers, notably when the latter belong to a same local network. Further, the synchronizing device may be implemented entirely as software, for example in the C language, or at least partly as hardware.

In a particular embodiment, one of the networks has a single apparatus, consisting for example in a home network with only one PC, connected to the Internet via a modem. In a still more specific form, each of both networks has only one apparatus.

The time synchronizing device of the invention may make useless any resort to a precise timeserver clock. Anyway, it could alternatively be considered as a tool complementary to the timeserver contribution, notably to the NTP mechanism. In the latter case, the router synchronization may be usually based on the timeserver data. However, in case of any connection failure between the router and the timeserver, the synchronizing device is available for getting accurate time. In another application, advantageously combined with the former one, the timeserver is commonly used but gives an hour not adapted to local specificities. Then, the synchronizing device provides the required adaptation data, such as time zone and/or daylight saving time information.

The receiving means should be interpreted as not necessarily being only intended for passive reception, but possibly also including functions of extraction of useful data (typically in relation to the format of the received data).

Preferably:
  the intercepting means are intended to intercept the message and the receiving means are intended to receive and extract the synchronizing data in compliance with the HTTP protocol;
  and/or the preparing means are intended to prepare the time requests in the form of executable scripts, preferably based on the Java language; more specifically, those scripts are advantageously in the JavaScript language.

The HTTP protocol and Java scripts are particularly appropriate and convenient for the time synchronizing device according to the invention, since HTTP provides direct interaction between the gateway and the apparatus, and enables the gateway to retrieve time data from the apparatus by means of Java scripts. Also, messages received from the apparatus to the gateway in compliance with the HTTP protocol usually arrive on a given known reception port. Thus, HTTP combines the potentialities of message interception and of sending back time requests.

Otherwise, any communication protocol liable to be used for connecting apparatus to a network, to be understood by a router and to enable the insertion of instructions that can be executed by the apparatus for sending back information, could also be suitable. Preferably then, the protocol allows inserting the instructions transparently to the users of the apparatus.

The forwarding means are preferably intended to forward the intercepted message to the target network only after the exploiting means have exploited the synchronizing data obtained from the apparatus by means of the time request. In another embodiment, the forwarding means are intended to forward the intercepted message as soon as the time request has been prepared.

The preparing means are advantageously able to prepare the time request for getting at least one of the following synchronizing data: time zone and daylight saving time information. The time zone and/or daylight saving time information may be used later by the synchronizing device, notably in case a synchronization time is received from a timeserver (e.g. in the NTP frame). The preparing means may also prepare the time request for further directly getting the hour from the apparatus, based on its specific time clock.

Advantageously, the time synchronizing device comprises updating means for periodically. updating the synchronizing data so as to synchronize the local time clock, by periodically activating the operational set. Those updating means are preferably intended for using as the intercepted message for each of the updating periods, the first message received from at least one of the communication networks during that period.

This enables to take into account drifts in the local time clock. Additional activating of the updating means could be done in case of router reinitializing, since then, time in the router usually restarts from zero.

Also, the synchronizing device preferably comprises safety means able to activate the operational set for at least two successive messages from respectively at least two different apparatus, to compare the synchronizing data respectively obtained for the successive messages, to check consistency of the synchronizing data and to trigger a warning mechanism in case of inconsistency.

Several solutions may be put in practice for that warning mechanism, like advising all the concerned users, or only the lastly contacted one. In case of such an inconsistency, the time synchronizing device is advantageously able to obtain the synchronizing data from at least three apparatus, and to check if a majority of them is consistent. Then, it may be considered that only one or a few apparatus among them have a higher probability of time failure, and be warned consequently. Alternatively, the synchronizing device could get a correct hour from a timeserver. Then, it could thereby identify the failing specific clock(s) and contact only the corresponding apparatus.

Of course, the diagnosis of Inconsistency should take into account the relative places of the apparatus. For example, in a LAN, all apparatus thereof should probably have the same time zone and daylight saving time.

The nature of inconsistency to be tested is preferably defined at the synchronizing device. It could consist for example in a difference between two specific clock times of a given LAN that is above a predetermined threshold value. It could also consist in non-agreement between the time zones and/or the daylight saving times in apparatus of a same given LAN.

More generally, conflict management algorithms could be implemented.

Also, in case of small discrepancies between specific clock times, below a conflict management threshold, it may be advantageous that the synchronizing device averages the obtained times so as to determine an accurate time to be used.

Anyway, it could be interesting for applying the invention that some regular checking is done of the apparatus liable to give time data to the synchronizing device, for making sure that the time therein is set correctly. This is particularly convenient for a home network.

The invention also applies to a local gateway (which may be notably a modem or an HTTP proxy) intended to be arranged between a LAN and a WAN and to enable communication in both directions between the LAN and the WAN. The local gateway comprises:
- a LAN interface for communication with the LAN,
- a WAN interface for communication with the WAN,
- a local gateway time clock,
- and synchronizing means for synchronizing the local gateway time clock with respect to a reference time clock, by means of synchronizing data received by the local gateway.

According to the invention, the synchronizing means comprise a time synchronizing device compliant with any of the embodiments of the invention for synchronizing the local gateway, the source and target networks being respectively the LAN and the WAN for all intercepted messages, and the apparatus used for synchronizing being thus at least one point of the LAN.

Preferably, the synchronizing means are also able to synchronize the local gateway time clock with respect to a global time clock available from a timeserver of the WAN.

The invention further relates to a process for time synchronizing a router arranged between two communication networks. The time synchronizing process comprises the following steps:
- receiving synchronizing data based on a reference time clock,
- and exploiting those synchronizing data so as to synchronize a local time clock used by the router with respect to the reference time clock.

According to the invention, the time synchronizing process also comprises the following steps:
- intercepting at least one message coming from at least one apparatus being a point of at least one of the networks, called the source network for that message, and directed to the other of the networks, called the target network for that message, that apparatus having a specific time clock,
- preparing a time request intended for that apparatus, that time request being able to be executed in that apparatus so as to cause the synchronizing data based on that specific time clock to be obtained back from the apparatus,
- sending the time request to that apparatus,
- and forwarding the intercepted message to the target network after the time request has been prepared.

The receiving step further includes receiving the synchronizing data from that apparatus and the exploiting step includes exploiting the synchronizing data so as to synchronize the local time clock with respect to that specific time clock.

The time synchronizing process is preferably intended to be executed by means of a time synchronizing device compliant with any embodiment of the invention.

The invention also concerns a computer program product comprising program code instructions for the execution of the process according to the invention when that program is executed on a computer. By "computer program product", it is meant a support for a computer program, which can consist in a non-transitory storing space containing that program, such as a diskette or cassette.

The invention will be better understood and illustrated by means of the following embodiment and execution examples, in no way limitative, with reference to the appended figures on which:

Figure 2:
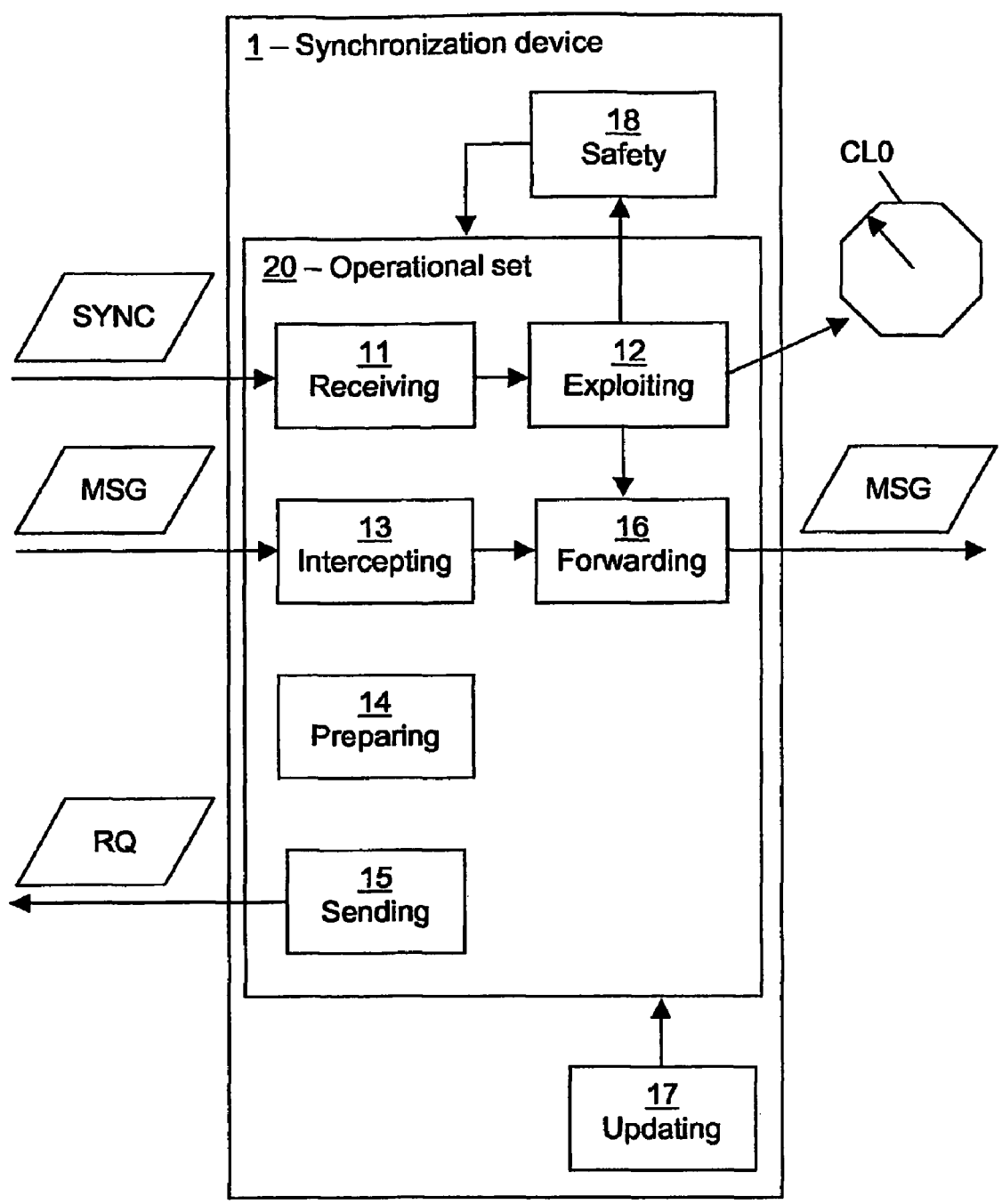
FIG. 2 is a block diagram detailing the synchronizing device of FIG. 1.

In FIG. 2, the represented blocks are purely functional entities, which do not necessarily correspond to physical separated entities. Namely, they could be developed in the form of software, or be implemented in one or several integrated circuits.

Figure 1:
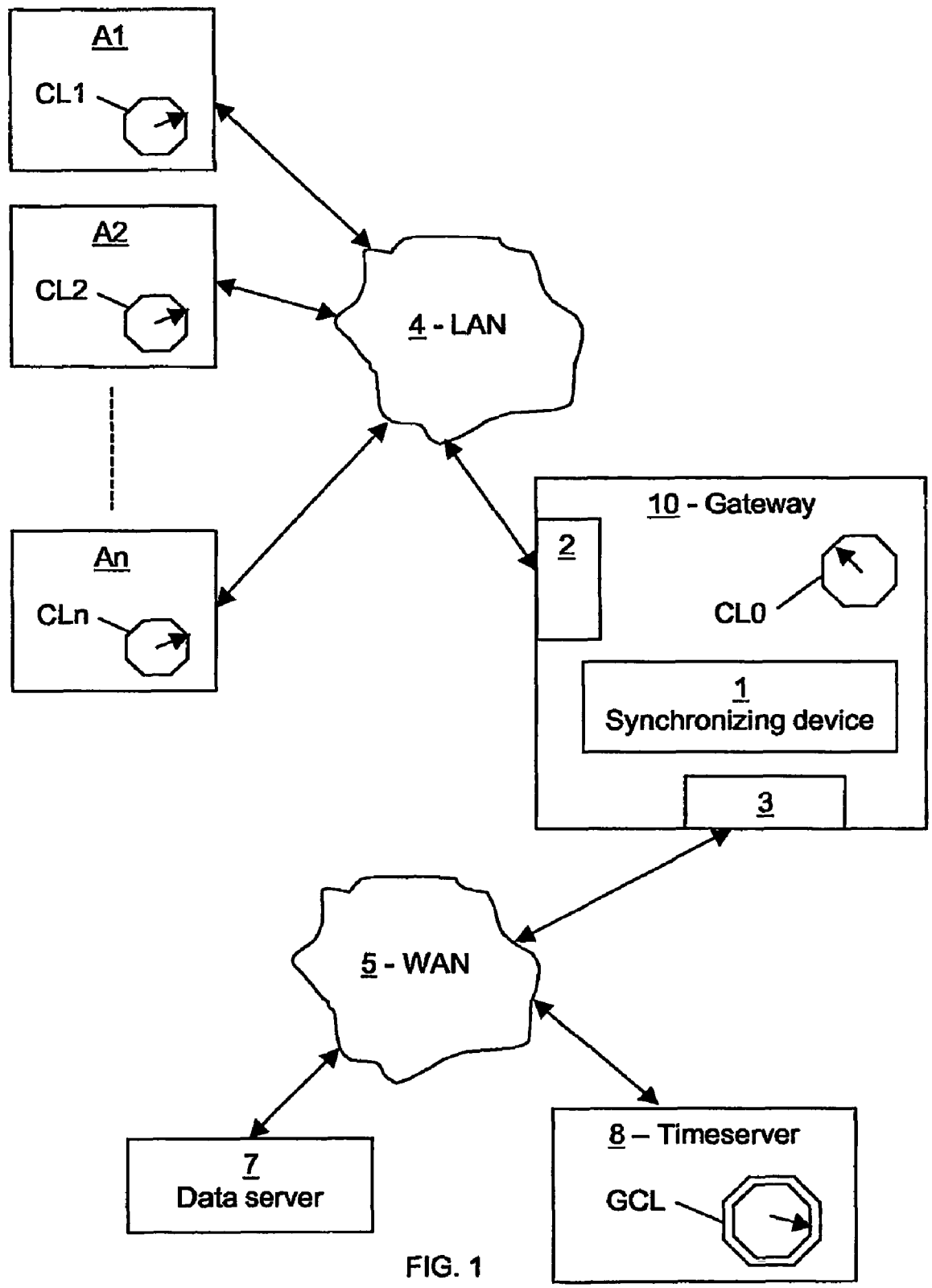
FIG. 1 shows a local area network connected to a wide area network via a gateway that includes a time synchronizing device compliant with the invention.

A gateway 10 (FIG. 1) is arranged between a Local Area Network (LAN) 4 and a Wide Area Network (WAN) 5, and provides communications between both networks 4 and 5 via network interfaces 2 and 3, respectively. The gateway 10 comprises a coarse clock CL0 and a time synchronizing device 1, able to synchronize the clock CL0 with respect to at least one more accurate remote clock.

The Lan 4 may be provided with a plurality of apparatus A1, A2 . . . An, including respectively specific internal clocks CL1, CL2 . . . CLn. The WAN 5 is notably coupled with a data server 7, able to send information to the apparatus Ai of the LAN 4 under request, and with a timeserver 8, including a precise global clock GCL. The timeserver 8 is intended to give synchronization data to any device connected to the WAN 5.

The synchronization device 1 will be detailed below through its various functions. It comprises (FIG. 2) an operation set 20 including:
- a receiving unit 11 intended to receive reference synchronization data SYNC, and to extract them from a formatted message, if necessary,
- an exploiting unit 12 able to exploit the synchronization data SYNC so as to synchronize the coarse clock CL0,
- an intercepting unit 13 provided for intercepting a message MSG coming from any of the apparatus Ai of the LAN 4 and directed to the WAN 5, for example addressed to the data server 7,
- a preparing unit 14, able to prepare a time request RQ based on the message MSG and intended for the apparatus Ai from which the message MSG is originating; the time request RQ targets time data to be used by the synchronizing device 1 for synchronizing the coarse clock CL0;
- a sending unit 15 intended to send the time request RQ to the concerned apparatus Ai;
- and a forwarding unit 16 able to forward the message MSG formerly intercepted by the intercepting unit 13.

The time synchronizing device 1 also comprises an updating unit 17, intended to periodically activate the operational set 20 for updating the synchronizing data and for thus synchronizing the local time clock CL0. As the event for triggering the synchronization is not controlled by the gateway 10, namely receiving a message from one of the apparatus Ai and directed to the WAN 5, this means that the updating unit 17 puts the operational set 20 in a "ready" state, able to execute the synchronizing process when a relevant message passes through the gateway 10. Preferably, that message MSG is the first one received by the latter as soon as a new synchronization period starts.

The updating unit 17 is also able to activate the operational set 20 in other particular circumstances, such as when an operator decides to, or when the gateway 10 is re-initialized.

In practice, the updating unit 17 may check if the operational set 20 must be activated each time a message MSG addressed to the WAN 5 is received from one of the apparatus Ai.

The time synchronizing device 1 further comprises a safety unit 18, able to activate the operational set 20 for at least two successive messages MSG coming from respectively at least two of the apparatus Ai, to compare the synchronizing data SYNC respectively obtained for those successive messages, to check their consistency, and to trigger a warning mechanism in case of inconsistency.

In a specific example, the apparatus Ai are home computers provided with Internet browser applications that are JavaScript enabled, the LAN 4 being a home network and the WAN 5 being the Internet. The protocol HTTP is further used. Then, the preparing unit 14 is intended to prepare the time request RQ in the form of a JavaScript script, which automatically executes when received by the involved home computer, as HTTP response.

Figure 3:
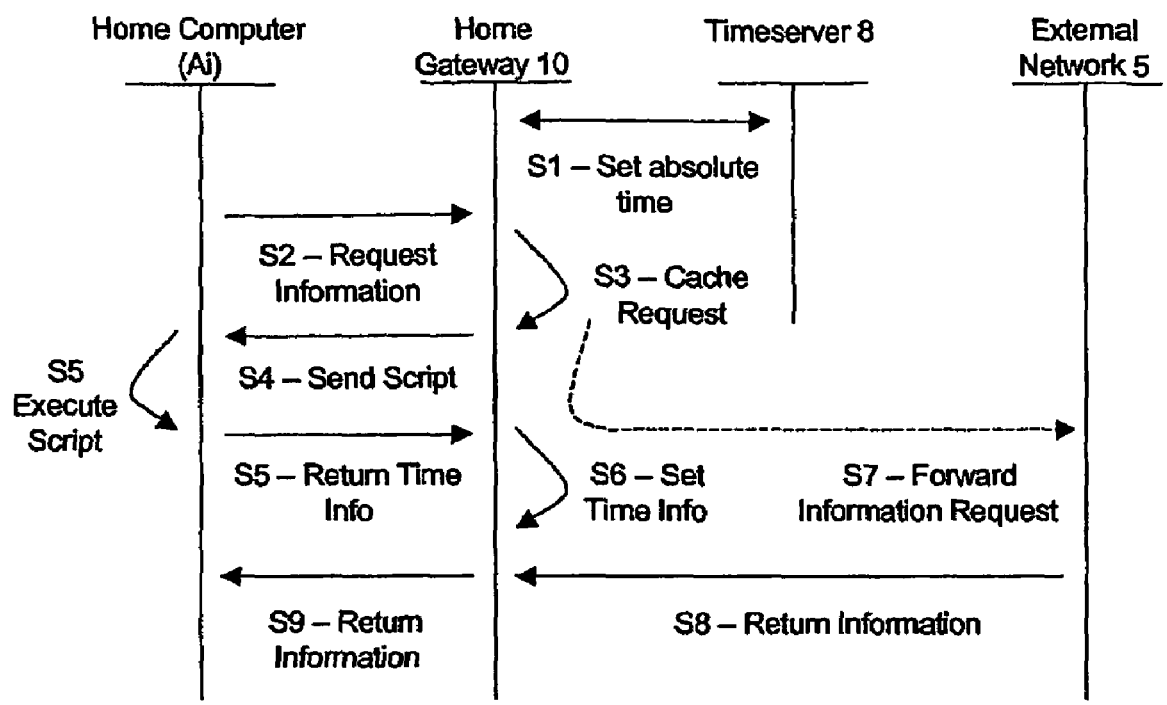
FIG. 3 illustrates the main steps of the synchronizing process executed by means of the synchronizing device of FIGS. 1 and 2.

When operated, the synchronizing device 1 leads to the following development (FIG. 3):

- after startup, the home gateway 10 gets absolute time from the timeserver 8 (if the latter is available) (step S1);
- a home user of one of the apparatus Ai tries to access the WAN 5 to get some information (step S2); typically, the home user opens a Web-page when using the browser to get information from the Internet using HTTP, and an HTTP request is sent to the Internet data server 7;
- the gateway 10 sees the request for information, in the form of a message MSG (step S3), by intercepting the HTTP request; if time information related to the local clock CL0 is not yet complete or is considered as obsolete, the home gateway 10 does not forward immediately the message MSG to the external network 5; if on the contrary, time information is complete and considered as valid, the following steps S4 to S6 are not executed, and step S7 is immediately applied;
- the home gateway 10 returns to the home computer (apparatus Ai) the order to give its time information (time request RQ) (step S4); the order is in the form of a JavaScript script as a response to the HTTP request;
- the home computer returns its time information (synchronization data SYNC) after the execution of the script (step S5); in the present example, the script posts the time information from the client to the gateway 10 via a new HTTP request;
- the gateway 10 reconfigures itself using the time information provided by the home computer (step S6);
- the gateway 10 forwards the information request (message MSG) to the external network 5 (step S7); here, it relays the original browser HTTP request to the correct Internet data server 7;
- the external network 5 returns the requested information— here, HTTP information (step S8);
- and when the gateway 10 receives the requested information, it forwards it down to the home computer (step S9).

What is claimed is:

1. A time synchronizing device for synchronizing a router arranged between a first and a second communication network, said synchronizing device comprising:

receiving means for receiving first synchronizing data based on a reference time clock from said first communication network, and exploiting means for exploiting said first synchronizing data (SYNC) to synchronize a local time clock used by said router with respect to said reference time clock, wherein said time synchronizing device comprises:

intercepting means for intercepting a message (MSG) coming from an apparatus of said second communication network and directed to said first communication network, said apparatus of said second communication network having a specific time clock, preparing means for preparing a time request intended for said apparatus of said second communication network periodically or responsive to a state of said local time clock of said router, said time request for execution in said apparatus of said second communication network to cause second synchronizing data based on said specific time clock to be obtained from said apparatus of said second communication network and to be transmitted back to said time synchronizing device and to cause caching of the message (MSG), sending means for sending said time request to said apparatus of said second communication network, and forwarding means for forwarding said cached, intercepted message (MSG) to said first communication network after the preparing means has prepared said time request, said receiving means for further receiving said second synchronizing data from said apparatus of said second communication network and said exploiting means for further exploiting said second synchronizing data to synchronize said local time clock with respect to said specific time clock, said receiving means, exploiting means, intercepting means, preparing means, sending means and forwarding means forming an operational set.

2. The time synchronizing device according to claim 1, wherein said intercepting means intercepts said message and said receiving means receives and extracts said second synchronizing data in compliance with HTTP protocol.

3. The time synchronizing device according to claim 1, wherein said preparing means prepares the time request in the form of executable scripts based on Java.

4. The time synchronizing device according to claim 1, wherein said forwarding means forwards said cached, intercepted message (MSG) to said first communication network only after the exploiting means exploits said second synchronizing data obtained from said apparatus of said second communication network by means of said time request.

5. The time synchronizing device according to claim 1, wherein said preparing means prepares said time request for getting one of synchronizing local data time zone and daylight saving time information.

6. The time synchronizing device according to claim 1, wherein said time synchronizing device comprises updating means for periodically updating said second synchronizing data based on said specific time clock to synchronize said local time clock by periodically activating said operational set, said updating means using as said intercepted message for each of said updating periods, a first message received from said second communication network during said updating period.

7. The time synchronizing device according to claim 1, wherein said time synchronizing device comprises safety means for activating said operational set for two successive messages from respectively two different apparatus of said second communication network, to compare said second synchronizing data respectively obtained for said successive messages, to check consistency of said synchronizing data and to trigger a warning mechanism in case of inconsistency.

8. A local gateway intended to be arranged between a LAN and a WAN to enable communication in both directions between the LAN and the WAN, said local gateway comprising:
 a LAN interface for communication with the LAN,
 a WAN interface for communication with the WAN,
 a local gateway time clock, and
 synchronizing means for synchronizing said local gateway time clock with respect to a global reference time clock by means of first synchronizing data received by said local gateway,
 wherein said synchronizing means comprises a time synchronizing device for synchronizing said local gateway, the time synchronizing device comprising:
 intercepting means for intercepting a message (MSG) from an apparatus of the LAN and directed to the WAN, said LAN apparatus having a specific time clock,
 preparing means for preparing a time request for said LAN apparatus periodically or responsive to a state of said local gateway time clock, said time request for execution in said LAN apparatus to cause second synchronizing data based on a specific time clock of said LAN apparatus to be obtained from said LAN apparatus and transmitted back to the time synchronizing device and to cause caching of said message (MSG),
 sending means for sending said time request to said LAN apparatus, and
 forwarding means for forwarding said cached, intercepted message (MSG) to said WAN after the preparing means has prepared said time request,
 said synchronizing means comprising receiving means for receiving said second synchronizing data from said LAN apparatus and exploiting means for exploiting said second synchronizing data to synchronize said local gateway time clock with respect to said specific time clock.

9. The local gateway according to claim 8, wherein said synchronizing means synchronizes said local gateway time clock with respect to said global reference time clock available from a timeserver of the WAN.

10. A method for time synchronizing a router arranged between first and second communication networks, said method comprising:
 receiving first synchronizing data based on a reference time clock from said
 first communication network, and
 exploiting said first synchronizing data to synchronize a local time clock used by said router with respect to said reference time clock,
 wherein said time synchronizing method further comprises:
 intercepting at least one message coming from an apparatus of said second communication network and directed to the first communication network, said apparatus of said second communication network having a specific time clock,
 preparing a time request for said apparatus of said second communication network periodically or responsive to a state of said local time clock, said time request to be executed in said apparatus to cause second synchronizing data based on said specific time clock to be obtained back from said apparatus and caching of said intercepted message,
 sending said time request to said apparatus, and
 forwarding said cached, intercepted message to said first communication network after said time request has been prepared,
 receiving said second synchronizing data from said apparatus and exploiting said second synchronizing data to synchronize said local time clock with respect to said specific time clock.

11. The time synchronizing device according to claim 1 wherein said cached, intercepted message (MSG) comprises an HTTP information request message directed to a data server of the first communication network.

12. A non-transitory storing space with an executable program stored thereon, wherein the program instructs a computer in a router for time synchronizing between first and second communication networks to perform the following steps:
 receiving first synchronizing data based on a reference time clock from said first communication network, and
 exploiting said first synchronizing data to synchronize a local time clock used by said router with respect to said reference time clock,
 wherein said time synchronizing method further comprises:
 intercepting a message coming from an apparatus of said second communication network and directed to the first communication network, said apparatus of said second communication network having a specific time clock,
 preparing a time request for said apparatus of said second communication network periodically or responsive to a state of said local time clock, said time request to be executed in said apparatus to cause second synchronizing data based on said specific time clock to be obtained back from said apparatus and caching of said intercepted message,
 sending said time request to said apparatus, and
 forwarding said cached, intercepted message to said first communication network after said time request has been prepared,
 receiving said second synchronizing data from said apparatus and
 exploiting said second synchronizing data to synchronize said local time clock with respect to said specific time clock.

* * * * *